United States Patent [19]

Saito et al.

[11] Patent Number: 5,301,864
[45] Date of Patent: Apr. 12, 1994

[54] ULTRASONIC TAPE GUIDE DEVICE

[75] Inventors: Etsuro Saito; Takashi Sasao, both of Kanagawa, Japan

[73] Assignee: Sony Corporation, Tokyo, Japan

[21] Appl. No.: 8,301

[22] Filed: Jan. 25, 1993

[30] Foreign Application Priority Data

Jan. 27, 1992 [JP] Japan .................. 04-012283

[51] Int. Cl.⁵ .............................. B65H 27/00
[52] U.S. Cl. ....................... 226/196; 242/76
[58] Field of Search ............. 242/76; 226/190, 194, 226/196, 191; 384/1

[56] References Cited

U.S. PATENT DOCUMENTS

| | | | |
|---|---|---|---|
| 4,403,720 | 9/1983 | Grant | 226/190 |
| 4,593,956 | 7/1986 | Caruso et al. | 384/1 |
| 5,152,494 | 10/1992 | Saito | 242/76 |
| 5,188,272 | 2/1993 | Kanbe et al. | 242/76 X |

Primary Examiner—Daniel P. Stodola
Assistant Examiner—Paul T. Bowen
Attorney, Agent, or Firm—William S. Frommer; Alvin Sinderbrand

[57] ABSTRACT

A tape guide device has a guide member, a support shaft, flanges, a main shaft, a coil spring, a height adjustment nut, and a vibrating device, wherein the support shaft is disposed inside the guide member, the support shaft has teeth facing to a position of a node when the guide member is vibrated by the vibrating device, the teeth and the guide member are fixedly bonded to each other by an adhesive that presents a feature of a resilient member after the adhesive was cured, the main shaft is engaged with the support shaft so as to become freely slidable, the flange is attached to the support shaft with a clearance kept between it and an end face of the guide member and the guide member and the flanges can be adjusted in height under or against the bias of the coil spring by turning the height adjustment nut. The support shaft and the guide member are fixedly bonded to each other by the adhesive that becomes a resilient member after having been cured. Therefore, the ultrasonic vibration tape guide device that can prevent the vibration of the guide member from being attenuated due to the contact with the flanges and that can make the guide member inexpensive has a function to adjust the guide member and the flanges in height with high accuracy.

6 Claims, 10 Drawing Sheets

ULTRASONIC TAPE GUIDE DEVICE

BACKGROUND OF THE INVENTION

1. Field of the Invention

The present invention relates to a tape guide device for use in a video tape recorder or the like.

2. Description of the Prior Art

Tape guides for use in video tape recorders or the like are roughly classified into rotary tape guides and fixed tape guides.

The rotary tape guides are advantageous in that they impose less resistance to tapes guided thereby. However, the speeds of travel of the tapes guided by the rotary tape guides tend to reflect irregularities in the rotational speeds of bearings used in the rotary tape guides. Furthermore, if the direction in which a tape travels when it is guided by a rotary tape guide is not perpendicular to the axis of rotation of the rotary tape guide, then the tape is subjected to a transverse force applied by the tape guide. The latter drawback is aggravated when the tape is transversely shifted until an edge thereof is damaged by contact with a flange of the rotary tape guide, for example. Therefore, rotary tape guides are required to be machined and assembled with high accuracy, and hence cannot be manufactured easily.

The fixed tape guides allow tapes guided thereby to run stably, but present large resistance to the running tapes.

There has been a demand for a fixed tape guide which imposes smaller resistance to a running tape. One of such fixed tape guides that meet such a demand is an air tape guide for ejecting air from small holes defined in the surface of a guide body to float a tape off the guide body for thereby reducing the resistance applied to the tape. The air tape guide is still problematic since a compressor is required as an air pressure source.

To eliminate the drawbacks of the conventional tape guides, the assignee of the present application has previously proposed an ultrasonic vibration tape guide device (see Japanese Patent Application No. 02-103627). The ultrasonic vibration tape guide device employs an ultrasonic energy to reduce resistance to a running tape while allowing the tape to run stably as with fixed tape guides. The ultrasonic vibration tape guide device is adjustable in height. The proposed ultrasonic vibration tape guide device will be described below with reference to FIG. 1 of the accompanying drawings.

Figure 1:
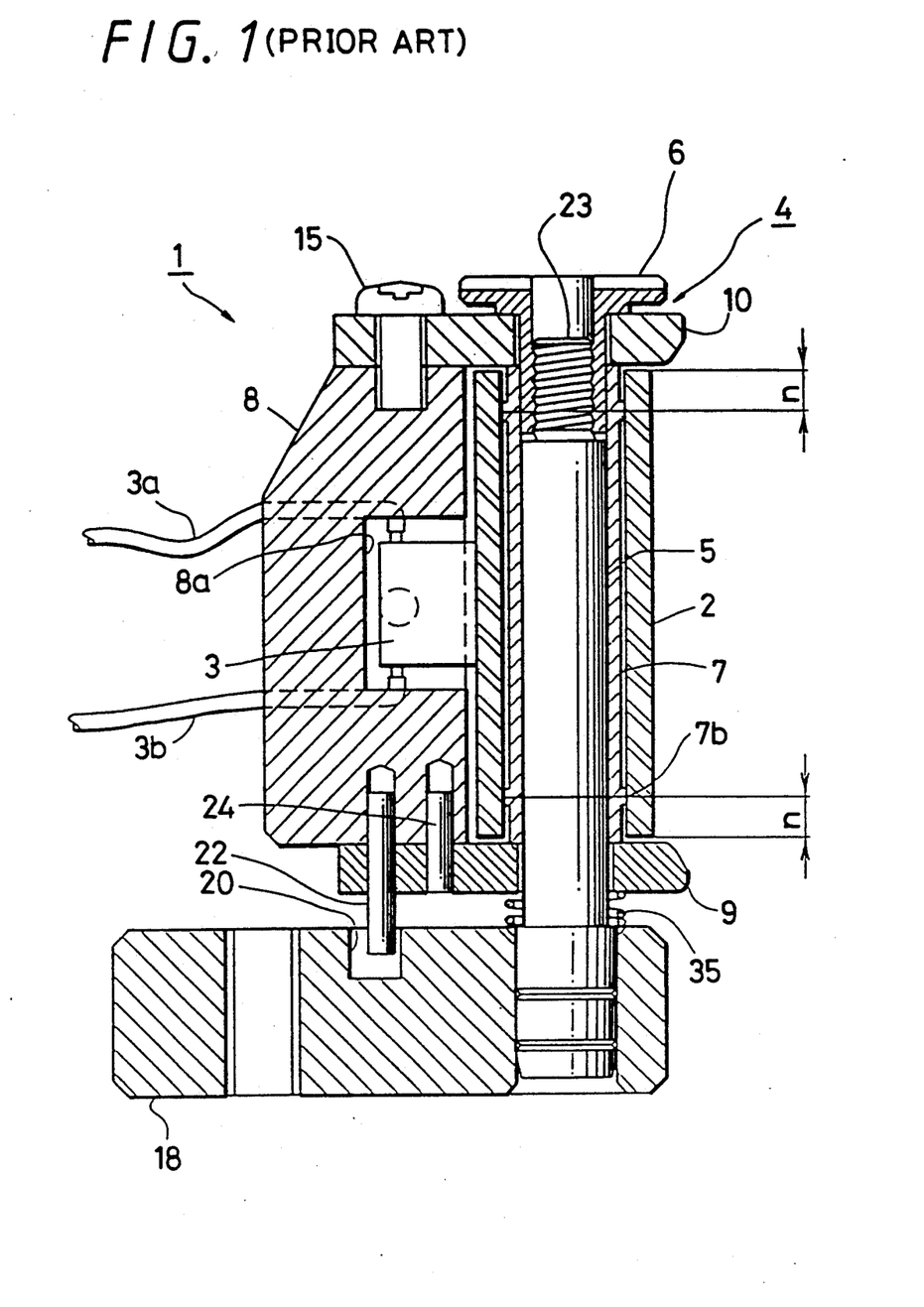
FIG. 1 is a cross-sectional view of a conventional ultrasonic tape guide device.

The ultrasonic tape guide device, generally designated by reference numeral 1, includes a main shaft 5 mounted vertically on a base 18, and an ultrasonic vibrator 3 fixed to a guide member 2 that is supported on support teeth 7b of a cylindrical support shaft 7 of brass.

Lower and upper flanges 9, 10 are disposed in abutment against lower and upper ends, respectively, of the support shaft 7, for guiding edges of a tape wound around the guide member 2.

The main shaft 5 extends through the lower and upper flanges, 9, 10 and the support shaft 7.

A height adjustment screw 6 is fitted in an upper end of the support shaft 7, and threaded over a screw 23 formed on the upper end of the main shaft 5.

The upper flange 10 is fastened to an upper end surface of an attachment 8 by a screw 15. The lower flange 9 is fixed to a lower end surface of the attachment 8 by fixing screws 22, 24.

Figure 2:
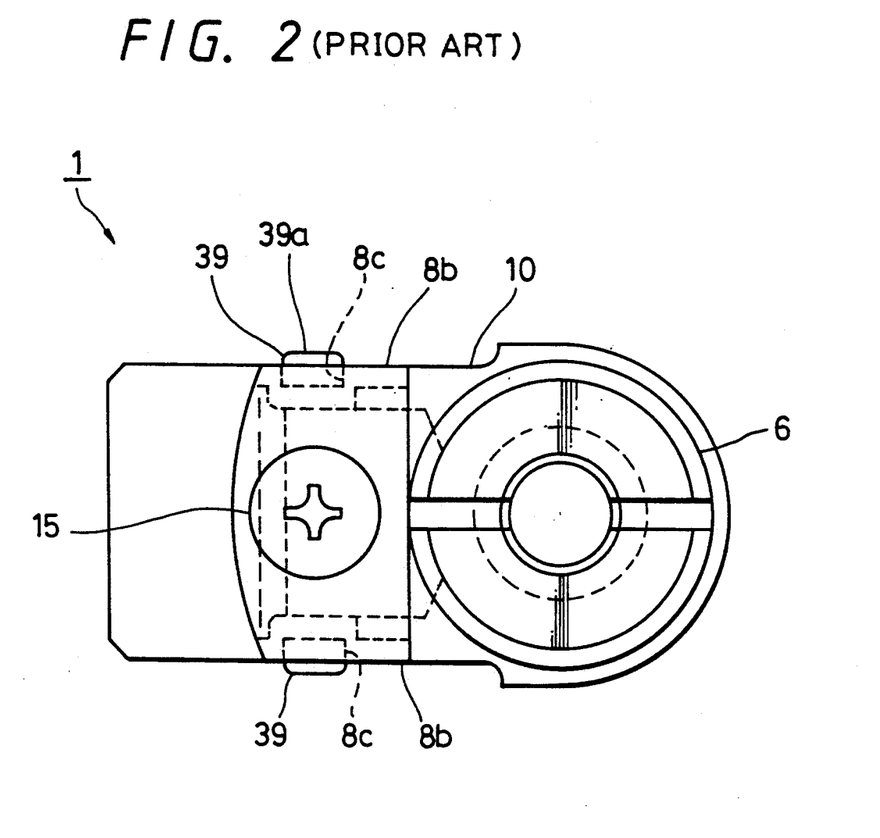
FIG. 2 is a plan view of the conventional ultrasonic tape guide device.

The attachment 8 has an ultrasonic vibrator storage space 8a defined therein which houses the ultrasonic vibrator 3 therein. As shown in FIG. 2 of the accompanying drawings, the ultrasonic vibrator space 8a is defined as a hole in the shape of a rectangular parallelpiped between side walls 8b having respective stopper insertion holes 8c defined therein.

Disc-shaped stoppers 39 made of rubber have engaging protrusions 39a fitted respectively in the stopper insertion holes 8c. The ultrasonic vibrator 3 is sandwiched between the stoppers 39 to prevent the guide member 2 from rotating with respect to the attachment 8.

The attachment 8 keeps the lower and upper flanges 9, 10 parallel to each other and spaced from each other by a distance that is about 0.1 mm larger than the length of the guide member 2.

As shown in FIG. 1, the lower flange 9 is normally urged upwardly under the bias of a coil spring 35 disposed around the main shaft 5 between the lower flange 9 and the base 18. The base 18 has a pin insertion hole 20 in which there is inserted an end of the fixing pin 22 that projects downwardly from the lower flange 9.

When the height adjustment screw 6 is turned, the guide member 2 is adjusted in height under or against the bias of the coil spring 35.

Figure 3:
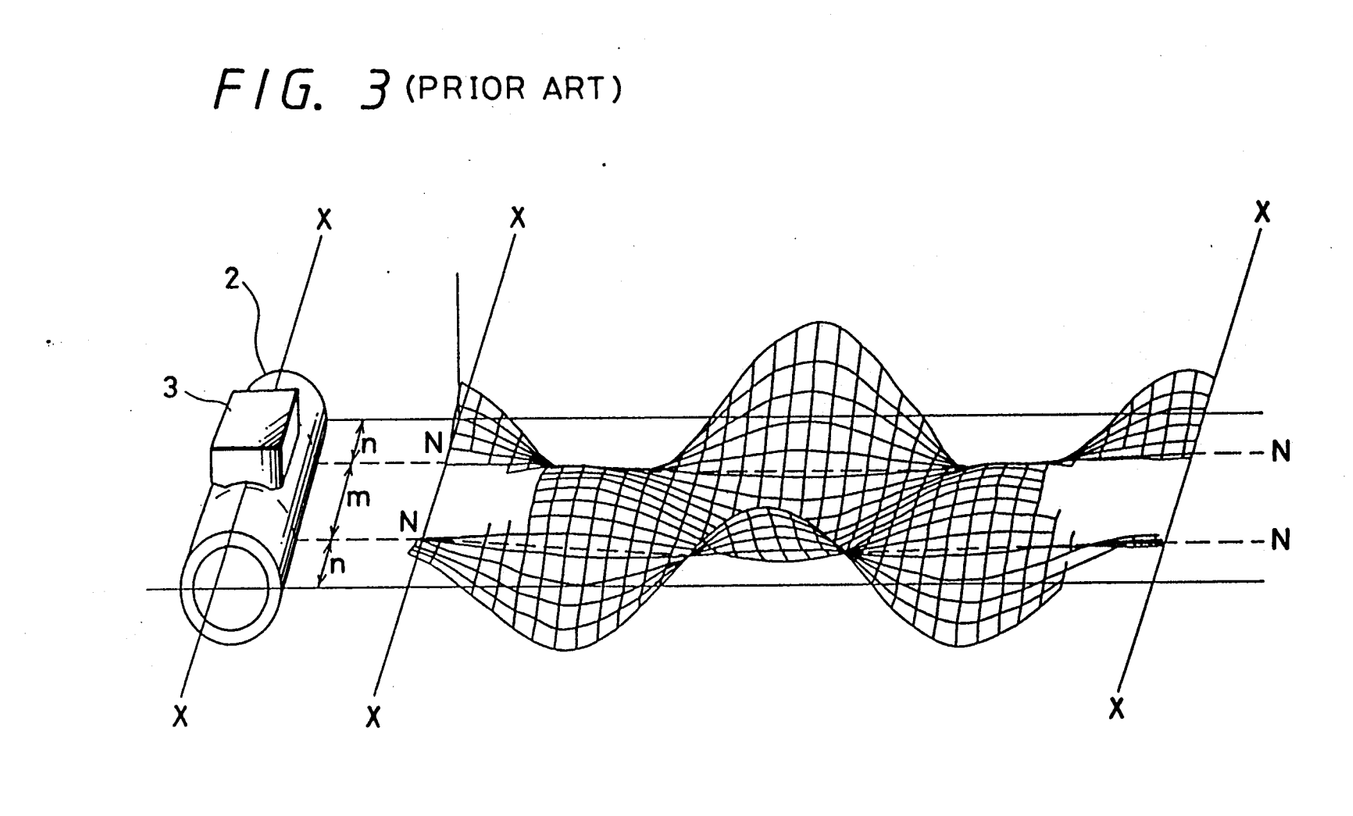
FIG. 3 is a graph showing standing-wave vibrations of the conventional ultrasonic tape guide device.

FIG. 3 of the accompanying drawings shown standing-wave vibrations caused of the guide member 2 when an AC voltage is applied to the ultrasonic vibrator 3, the standing-wave vibration being illustrated along line X—X.

In FIG. 3, dotted lines N—N represent nodes on the guide member 2 where the vibrations have zero amplitude. The nodes N on the guide members 2 are axially spaced from the ends of the guide members 2 by a distance n, and the support teeth 7b are also axially spaced from the ends of the guide member 2 by the distance n, i.e., are positioned at the nodes N.

In the example of the conventional tape guide device, as will be clear from the foregoing description, the guide member 2 sandwiched by the upper and lower flanges 9, 10 attached to the attachment 8 is adjusted in height by turning the height adjustment screw 6 that is threaded over the main shaft 5. This arrangement makes the tape guide complex in structure and the main shaft 5, the upper and lower flanges 9, 10 and the attachment 8 become complex in shape, which hinders the tape guide from becoming inexpensive.

The guide member 2 and the support shaft 7 are assembled by the engagement of the inner diameter of the guide member 2 and the outer diameters of the teeth 7a, 7b of the support shaft 7. Therefore, the inner diameter of the guide member 2 and the outer diameters of the teeth 7a, 7b are required to be machined with high accuracy in dimension. Further, the conventional tape guide becomes complex in structure and hence cannot be assembled easily, which also hinders the reduction of its cost.

Furthermore, the upper and lower flanges 10, 9 urge the upper and lower ends, respectively, of the guide member 2 so that the vibration of the guide member 2 is caused to be attenuated. Therefore, the conventional tape guide cannot allow the tape to be guided and to run satisfactorily.

OBJECTS AND SUMMARY OF THE INVENTION

In view of the aforesaid drawbacks of the convention tape guide devices, it is an object of the present invention to provide an ultrasonic tape guide device which can prevent a vibration of a guide member from being attenuated due to the contact with flanges.

It is another object of the present invention to provide an ultrasonic tape guide device in which a guide member is made inexpensive to manufacture.

It is still another object of the present invention to provide an ultrasonic tape guide device which has a function to adjust a guide member and flanges in height with high accuracy.

According to an aspect of the present invention, there is provided a tape guide device which comprises a guide member, a support shaft, flanges, a main shaft, a coil spring, a height adjustment nut, and vibrating means, wherein the support shaft is disposed inside the guide member, the support shaft has teeth facing to a position of a node when the guide member is vibrated by the vibrating means, the teeth and the guide member are fixedly bonded to each other by an adhesive that presents a feature of a resilient member after the adhesive was cured, the main shaft is engaged with the support shaft so as to become freely slidable, the flange is attached to the support shaft with a clearance kept between it and an end face of the guide member and the guide member and the flanges can be adjusted in height under or against the bias of the coil spring by turning the height adjustment nut.

According to another aspect of the present invention, there is provided a tape guide device which comprises a guide member, a support shaft, a flange, a main shaft, a coil spring, and vibrating means, wherein the support shaft is disposed inside the guide member, the support shaft has teeth facing to a position of a node when the guide member is vibrated by the vibrating means, the teeth and the guide member are fixedly bonded to each other by an adhesive that presents a feature of a resilient member after the adhesive was cured, the main shaft is engaged with the support shaft so as to become freely slidable, the flange is attached to the support shaft with a clearance kept between it and an end face of the guide member and the guide member and the flange can be adjusted in height under or against the bias of the coil spring by turning the flange.

The ultrasonic tape guide device may include the main shaft, upper and lower flanges, the height adjustment screw, the coil spring, the tubular guide member, the ultrasonic vibrator having a free end and the other end thereof being fixed to the guide member for applying standing-wave vibrations to the guide member and the support shaft having teeth.

The teeth on the support shaft are disposed in an opposing relation to the nodes of vibrations generated on the guide member. The adhesive that becomes the resilient member after having been cured is filled into the clearance between the teeth and the guide member. Therefore, the adhesive is filled into the clearance owing to the capillary action. The bonded portion is limited to the portion near the teeth opposing the nodes, thereby preventing the vibrations from being attenuated when other portions than the nodes are bonded.

Since the support shaft has a length substantially equal to a distance between the nodes of the vibrations, an adhesive instrument such as a fountain pen filler or the like can be located close to the bonding portion. Also, the bonding portion can be seen and therefore the injection work and the confirming work of the adhesive can be easily effected.

There is provided the clearance between the inner diameter surface of the guide member and the outer diameter surface of the teeth. This clearance is filled with the adhesive that becomes the resilient member after having been cured. Hence, the guide member and the teeth are not required to be machined in inner diameter and in outer diameter with high accuracy and these assemble parts can be made inexpensive to manufacture.

The upper and lower flanges may have the cylindrical portions, respectively. Therefore, even when the end faces of the support shaft are brought in contact with the end faces of the cylindrical portions, the clearances are produced, respectively, between the end faces of the guide member and the upper and lower flange guide surfaces. Hence, the end faces of the guide member can be prevented from being urged against the upper and lower flange guide surfaces and the vibration of the guide member can be prevented from being attenuated.

By turning the height adjustment screw, the portion between the upper and lower flanges can be moved in the height direction under or against the bias of the coil spring. Hence, the adjustment mechanism for adjusting the position in the height direction can be realized by the simple structure and the tape travel can be guided in an optimum fashion.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

An ultrasonic tape guide device according to a first embodiment of the present invention will hereinafter be described with reference to FIG. 4.

Figure 4:
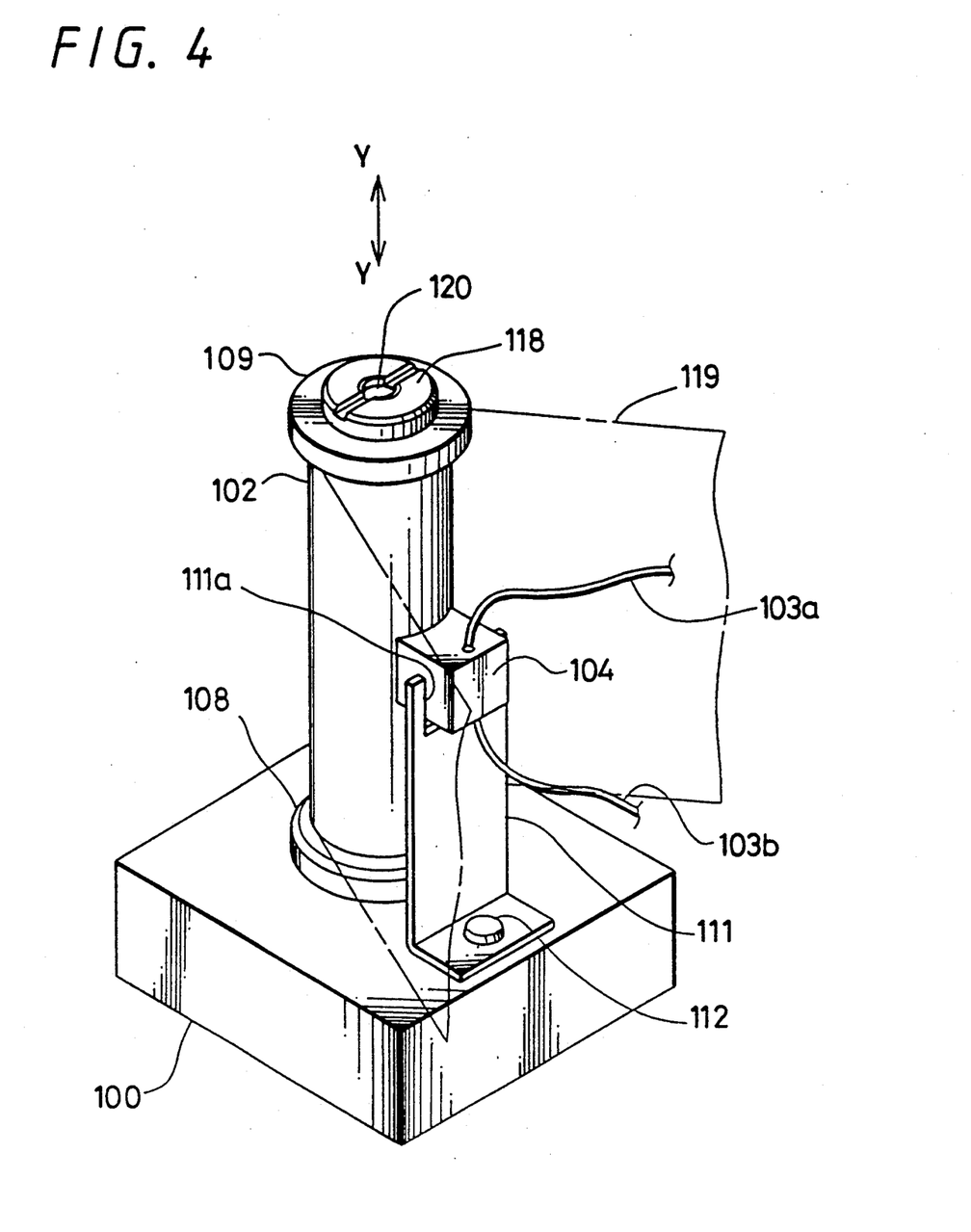
FIG. 4 is a perspective view of a tape guide device according to an embodiment of the present invention.

In FIG. 4 of the accompanying drawings, reference numeral 100 designates a base, 109 an upper flange, 108 a lower flange and 119 a tape.

A guide member 102 includes an ultrasonic vibrator 104 fixed at one end face to a predetermined position in the outer circumferential surface of the guide member 102 by some suitable means such as an adhesive or the like.

Power supply lead wires 103a, 103b are respectively connected to the ultrasonic vibrator 104 at its upper and lower portions in FIG. 4.

A rotation preventing member 111 is secured to the base 100 by a screw 112, and the ultrasonic vibrator 104 is held in a recess 111a of the rotation preventing member 111.

Figure 5:
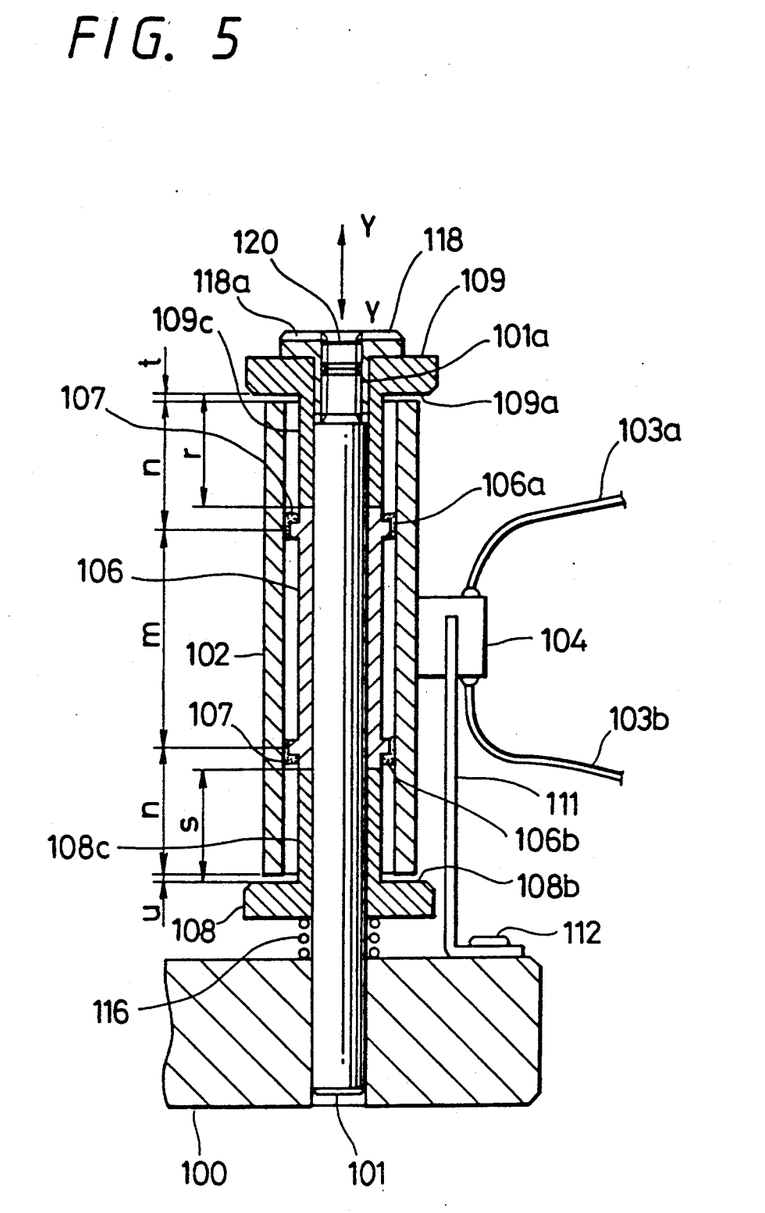
FIG. 5 is a cross-sectional view of the embodiment of the tape guide device according to the present invention.
Figure 6:
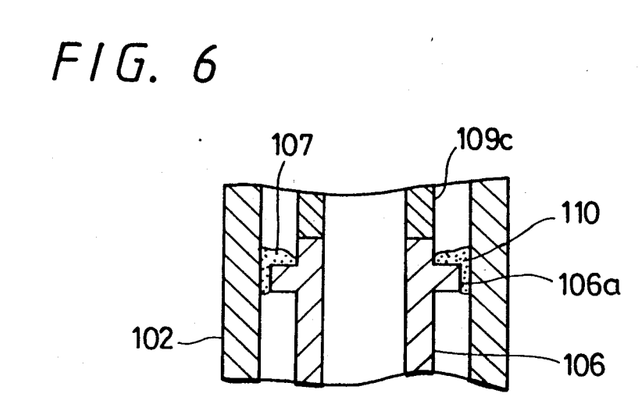
FIG. 6 is a partly-enlarged cross-sectional view of the embodiment of the tape guide device according to the present invention.

FIG. 5 of the accompanying drawings shows a cross-sectional view of the tape guide device. As shown in FIG. 5 and FIG. 6 that shows a portion X in FIG. 5 in an enlarged scale, a main shaft 101 is vertically and downwardly assembled into the base 100 with pressure. A height adjustment screw portion 101a is disposed in the main shaft 101 at its upper end portion. The main shaft 101 extends through a support shaft 106, an upper flange 109 and a lower flange 108 so as to become freely rotatable and slidable. The guide member 102 is fixed to the support shaft 106 by an adhesive 107. How to fix the guide member 102 to the support shaft 106 will be described more fully later on.

A coil spring 116 extends through the main shaft 101 between the lower flange 108 and the base 100. A height adjustment nut 118 is threaded over the height adjustment screw portion 101a.

Generally, when the tape guide device is assembled into a video tape recorder or the like for guiding the tape, the tape guide device is required to have a height direction position adjustment function in order to optimize the tape guide with high accuracy.

The height direction position adjustment function assembled into the tape guide device will be described below. The height direction is shown by arrow Y—Y in FIGS. 4 and 5.

A locking screw 120 is loosened before the height is to be adjusted. Thereafter, the height adjustment nut 118 is turned by a minus screw driver meshed with a slit 118a of the height adjustment nut 118, whereby the height adjustment nut 118 is moved in the Y—Y direction. As a result, under or against the bias of the coil spring 116, the support shaft 106 and the guide member 102 fixed to the support shaft 106, the upper flange 109 and the lower flange 108 are guided by the main shaft 101 to move in the Y—Y direction.

The main shaft 101 is inserted into a hole 100b bored through the base 100 with pressure. The axial direction of the main shaft 101 is kept in the constant direction relative to the base 100 so that, even when the height direction position is adjusted, the axial direction of the guide member 102 is not changed. Hence, the height adjustment can be effected with high accuracy.

The main shaft 101 and the support shaft 106 are in rotatable and slidable engagement with each other. Also, the ultrasonic vibrator 104 fixed to the guide member 102 is held at the recess portion 111a of the rotation preventing member 111. Therefore, even when the height adjustment nut 118 is turned, the guide member 102 can be prevented from being rotated and can be moved only in the Y—Y direction.

The upper and lower flanges 109, 108 that guide the travel of the tape 119 are properly adjusted in position.

The assembly process of the guide member 102 and the support shaft 106 will be described below.

Figure 7:
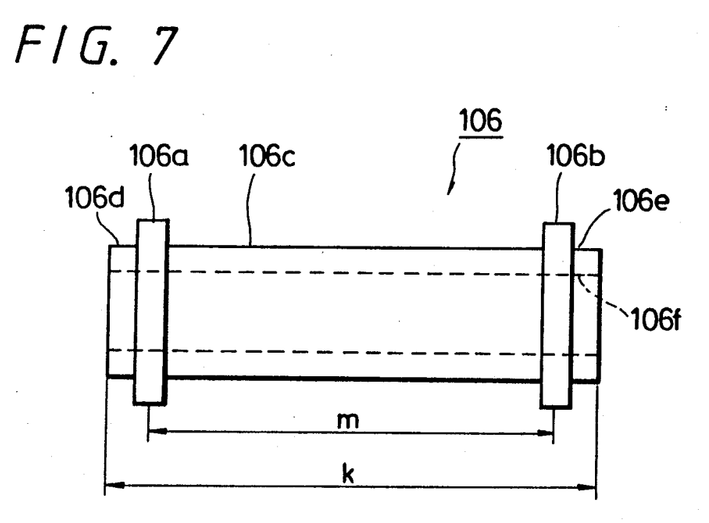
FIG. 7 is a diagram showing a support shaft used in the embodiment of the tape guide device according to the present invention.

As shown in FIGS. 6 and 7, the support shaft 106 has teeth 106a, 106b, each of which has an outer diameter that is slightly smaller than the inner diameter of the guide member 102 and an inside small diameter portion 106c and outside small diameter portions 106d, 106e.

The outside small diameter portions 106d, 106e are disposed in order to prevent an inside diameter portion 106f of the support shaft 106 from being smudged by the adhesive 107 unnecessarily.

Figure 8:
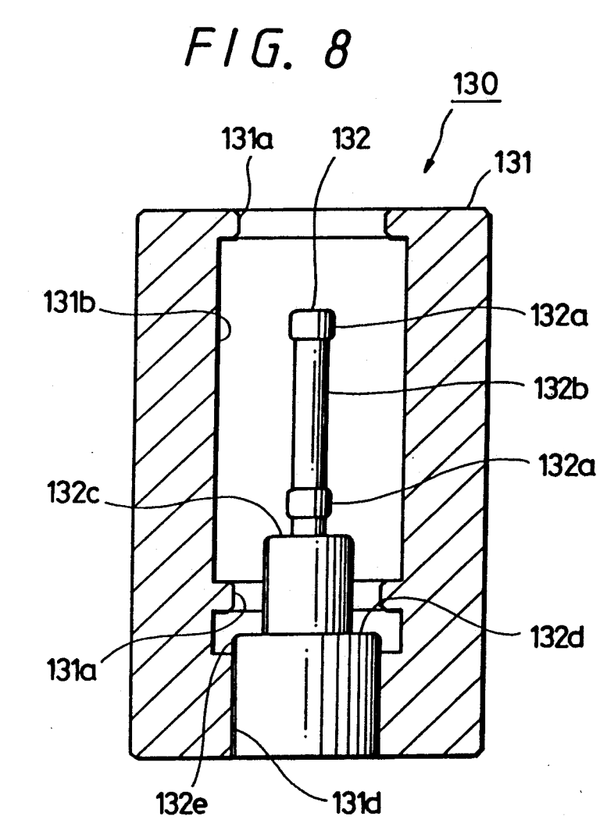
FIG. 8 is a cross-sectional view showing a support shaft assemble jig used in the embodiment of the tape guide device according to the present invention.

FIG. 8 of the accompanying drawings shows a support shaft assemble jig 130. As shown in FIG. 8, the support shaft assemble jig 130 comprises an outer cylinder 131 and a support shaft inner diameter positioning shaft 132. The outer cylinder 131 and the support shaft inner diameter positioning shaft 132 are assembled by inserting a pressure shaft portion 132e formed on the support shaft inner diameter positioning shaft 132 into a pressure hole 131d bored through the outer housing 131 with pressure.

The outer cylinder 131 has a guide member outer diameter positioning hole 131a and the support shaft inner diameter positioning shaft 132 has a support shaft inner diameter positioning portion 132a. Reference numerals 131b and 132b designate escapes, respectively.

The support shaft inner diameter positioning shaft 132 has a support shaft axial direction positioning stepped portion 132c and a liquid member axial direction positioning stepped portion 132d.

Figure 9:
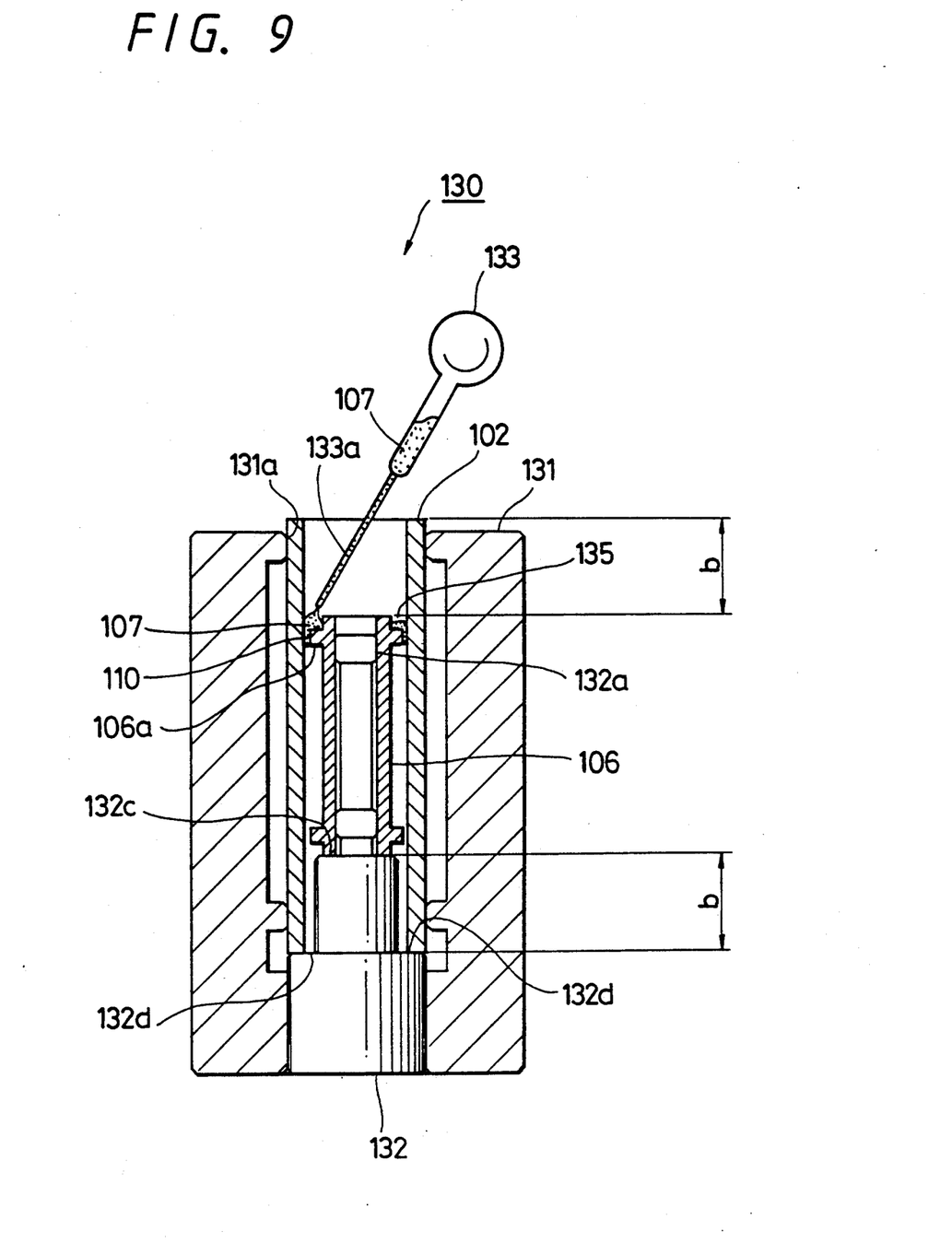
FIG. 9 is a cross-sectional view showing the situation that the support shaft assemble jig used in the embodiment of the tape guide device according to the present invention is utilized.

FIG. 9 shows the condition that the guide member 102 and the support shaft 106 are assembled on the support shaft assemble jig 130. The support shaft 106 is determined in position in both the diametrical direction and the axial direction by the support shaft inner diameter positioning portion 132a and the support shaft axial direction positioning stepped portion 132c.

The guide member 102 is determined in position both in the diametrical direction and the axial direction by the guide member outer diameter positioning hole 131a and the guide member axial direction positioning stepped portion 132d.

When the guide member 102 and the support shaft 106 are attached to the support shaft assemble jig 130, a clearance 110 of about 0.1 mm is uniformly formed in the circumferential direction between the inner periphery of the guide member 102 and the outer periphery of the teeth 106a, 106b formed on the support shaft 106.

Reference numeral 133 in FIG. 9 depicts a fountain pen filler and 107 the adhesive. As the adhesive 107, there is employed a thermosetting silicon adhesive which is in the liquid state and proper fluid state before being cured and which also is presented in the form of a rubber-like resilient member after being cured.

The adhesive 107 is injected into a groove 135 formed by the outside small diameter portion 106e of the support shaft 106 and the inner wall surface of the guide member 102 by means of a tip end 133a of the fountain pen filler 133 disposed near the groove 135.

Since the adhesive 107 is in the proper liquid state before being cured, the adhesive 107 is filled into the clearance 110 between the guide member 102 and the teeth 106a owing to a capillary action.

Accordingly, the bonded portion is limited in the portion near the teeth 106a, 106b opposing the nodes so that the vibration can be prevented from being attenuated when other portions than the nodes are bonded.

In this state, the adhesive agent 107 is heated, cured and becomes flexible like a rubber, whereby the guide member 102 and the teeth 106a formed on the support shaft 106 are fixed.

Figure 10:
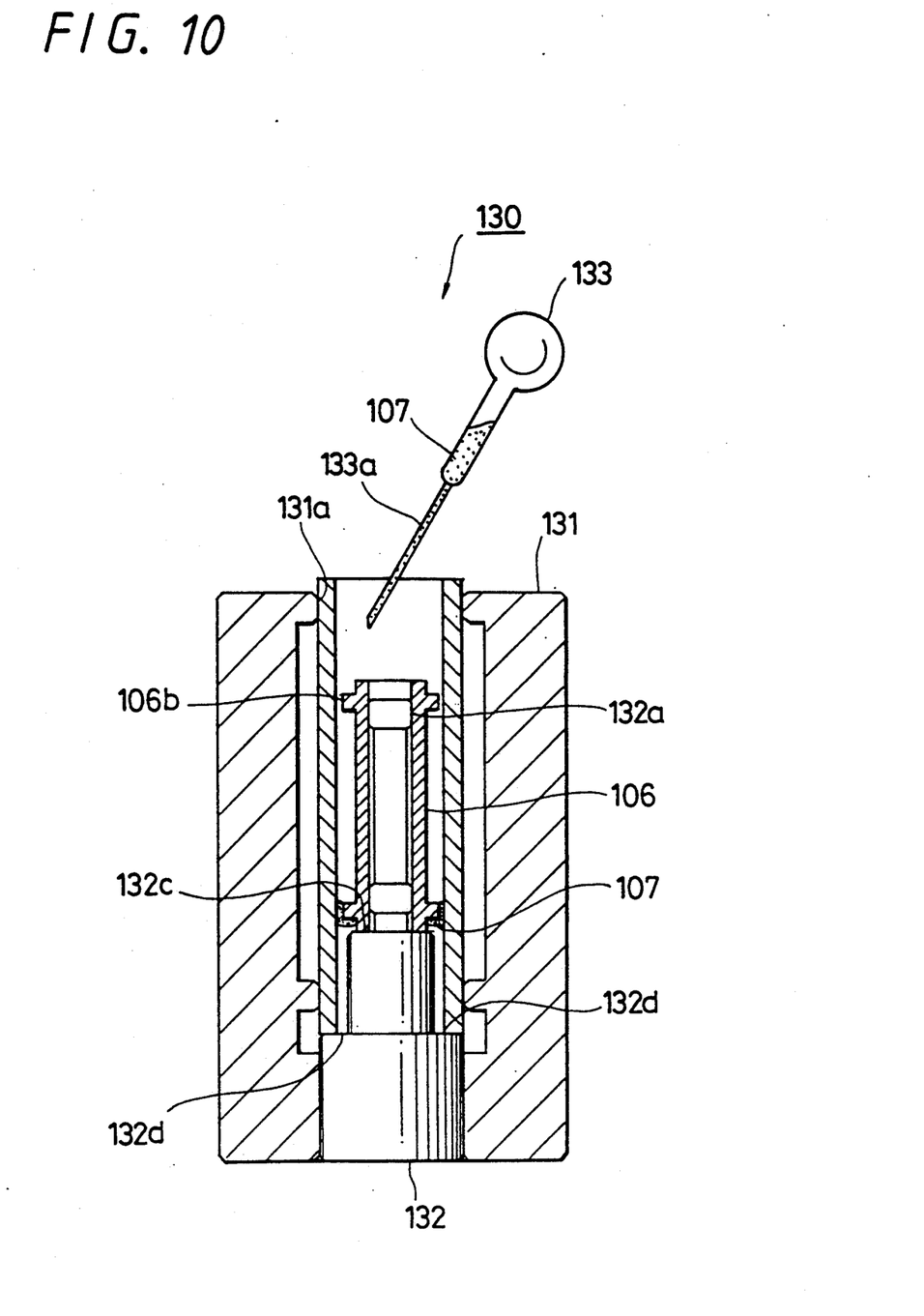
FIG. 10 is a cross-sectional view showing the situation that the support shaft assemble jig used in the embodiment of the tape guide device according to the present invention is utilized.

The teeth 106b on the support shaft 106 and the guide member 102 are fixed each other by inserting reversely the fixed guide member 102 and the teeth 106a into the support shaft assemble jig 130 into which the adhesive 107 is injected, heated and then cured as shown in FIG. 10.

When the tape guide device body is driven, standing waves generated on the guide member 102 become as shown in FIG. 3.

As shown in FIG. 3, dotted line N—N represent nodes and there is no amplitude on this line. Therefore, by supporting the guide member 102 along the line, the amount in which the vibration is attenuated by the support of the guide member 102 can be minimized.

In FIG. 3, n assumes a distance from each end face of the guide member 102 to the node position and m assumes a distance between the nodes. Then, as shown in FIG. 5, the positions at which the guide member 102 and the support shaft 106 are fixed by the adhesive 107 are respectively determined as distances n from the upper and lower end portions of the guide member 102 and m that represents a distance between the fixed positions.

Accordingly, as shown in FIG. 7, m assumes a distance between the teeth 106a and 106b formed on the support shaft 106.

According to this embodiment, the length of the guide member 102 is 19 mm while m=9.6 mm and n=4.7 mm. A full length k of the support shaft 106 is 10.2 mm and substantially equal to the distance m between the nodes.

The teeth 106a, 106b on the support shaft 106 are fixedly bonded to the guide member 2 at its positions of the nodes of the vibration with resiliency as described above.

Accordingly, by the resiliency of the adhesive 107, the guide member 102 can be supported under the condition that the attenuation of vibration can be suppressed to the minimum.

The upper and lower flanges 109, 108 have cylindrical portions 109c, 108c to keep the end face of the guide member 102 and the upper and lower flange guide faces 109a, 108b spaced apart by predetermined amounts even when the end faces of the support shaft 106 are brought in contact with the end faces of the cylindrical portions 109c, 108c.

More specifically, as shown in FIG. 5, assuming that p and q respectively represent distances from both end faces of the support shaft 106 to both end faces of the guide member 102, then lengths r and s of the cylindrical portions 109c, 108c are determined as r=p+t and s=q+u in FIG. 5 where t is the clearance between the upper flange guide surface 109a and the upper end face of the guide member 102 and u is the clearance between the lower flange guide surface 108b and the lower end face of the guide member 102, respectively.

Since the clearances t and u are secured as described above, the end faces of the guide member 102 are prevented from coming in contact with the upper and lower flange guide surfaces 109a, 108b, thereby preventing the vibration of the guide member 102 from being attenuated.

As shown in FIG. 4, the magnetic tape 119 is trained around and guided by the guide member 102. When an alternating voltage having a frequency corresponding to the resonant frequency of the guide member 102 is applied from a driver circuit (not shown) or the like to the tape guide device through the leads 103a, 103b, standing wave vibration is applied to the guide member 102. At this time, the coefficient of friction between the magnetic tape 119 and the guide member 102 is much smaller than would be if the magnetic tape 119 were guided with no alternating voltage applied to the tape guide device.

Figure 11:
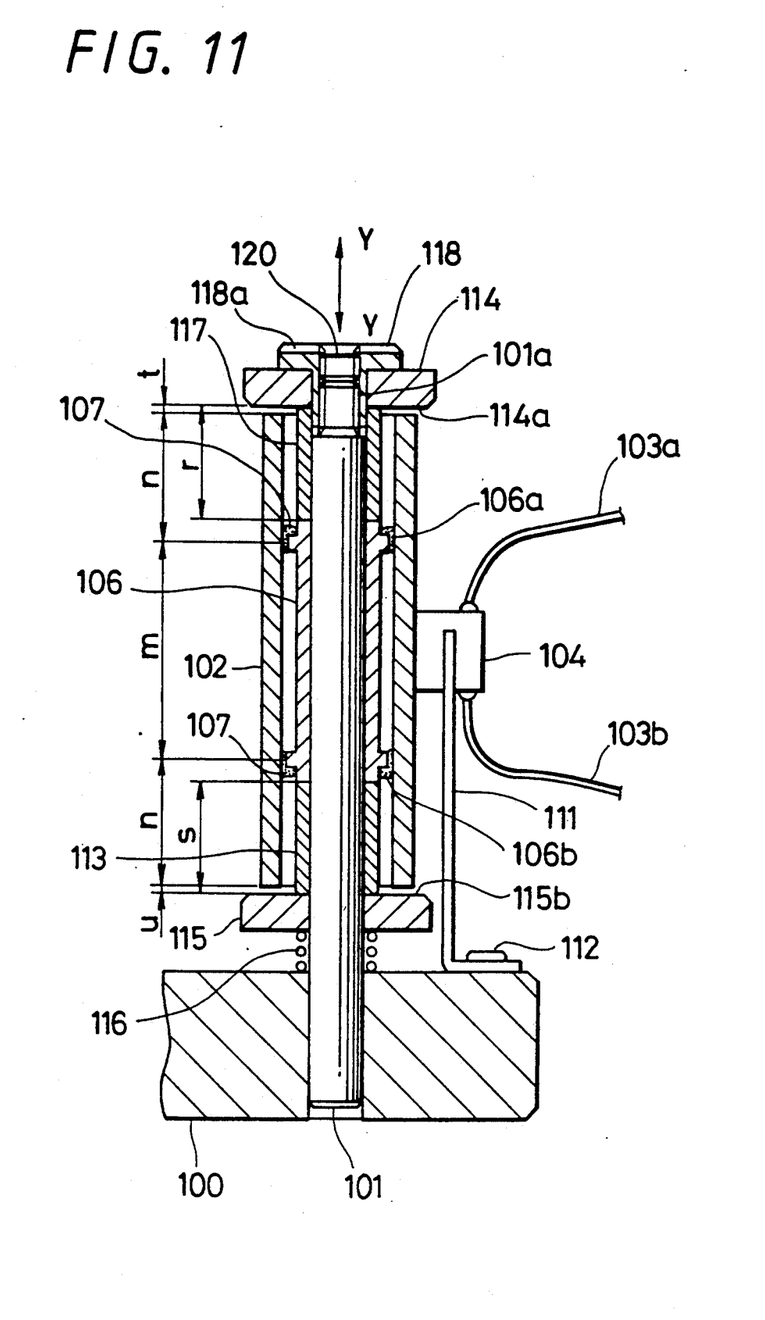
FIG. 11 is a cross-sectional view of the tape guide device according to a second embodiment of the present invention.

FIG. 11 is a cross-sectional view showing another embodiment of the tape guide device according to the present invention.

As shown in FIG. 11 of the accompanying drawings, the tape guide device of this embodiment is different from the tape guide device shown in FIG. 4 only in spacer seats 117, 113 and an upper flange 114 and a lower flange 115. A rest of elements in this tape guide device is similar to that of the tape guide device shown in FIG. 4. Therefore, in FIG. 11, like parts corresponding to those of the tape guide device shown in FIG, 4 are marked with the same references and need not be described in detail.

As shown in FIG. 11, the tape guide device has spacer seats 117, 113 that correspond to the cylindrical portions 109c, 108c disposed on the upper and lower flanges 109, 108 in FIG. 4.

The spacer seats 117, 113 are engaged with the main shaft 101 so as to become rotatable and slidable similarly to the upper and lower flanges 114, 115.

Reference symbols r and s in FIG. 11 depict respectively lengths of the spacer seats 117, 113. Similarly to the tape guide device shown in FIG. 4, a clearance t is kept between an upper flange guide surface 114a and the upper end face of the guide member 102 and a clearance u is kept between a lower flange guide surface 115b and the lower end face of the guide member 102, respectively.

Since the clearances t and u are retained as described above, the end faces of the guide member 102 can be prevented from being urged against the upper and lower flange surfaces 114a, 115b, thereby preventing the vibration of the guide member 102 from being attenuated.

Thus, the upper and lower flanges 114, 115 are simplified in shape and can be manufactured as inexpensive assemble parts.

Figure 12:
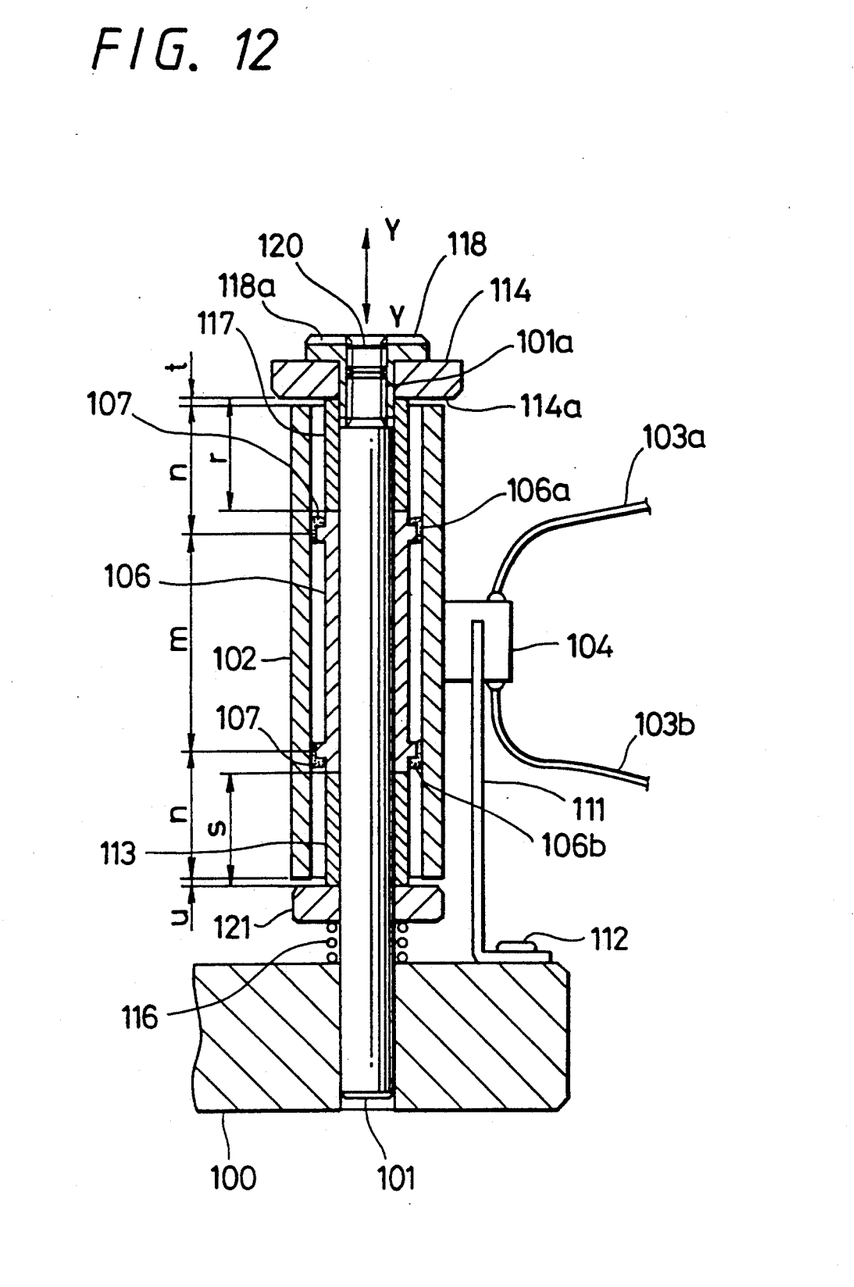
FIG. 12 is a cross-sectional view of the tape guide device according to a third embodiment of the present invention.

FIG. 12 is a cross-sectional view showing still another embodiment of the tape guide device according to the present invention.

As shown in FIG. 12 of the accompanying drawings, the tape guide device of this embodiment is different from the tape guide device shown in FIG. 11 only in a boss 121. In FIG. 12, like parts corresponding to those of the tape guide device shown in FIG. 11 are marked with the same references and therefore need not be described in detail, As shown in FIG. 12, the tape guide device employs the boss 121 instead of the lower flange 115 of FIG. 11. The boss 121 is engaged with the main shaft 101 so as to become freely rotatable and slidable.

The tape guide device shown in FIG. 12 is suitably applied to a tape guide device that is utilized in order to guide the tape only by the upper flange 114. An outer diameter of the boss 121 is substantially equal to that of the guide member 102. The outer circumferential surface of the boss 121 is effectively utilized as a temporary tape guide surface during the tape is being loaded when the tape guide device is employed as a tape guide device of a recording and reproducing apparatus in which a tape loading is automated.

From the foregoing description, it is clear that a tape guide device having only a lower flange can be proposed as yet another embodiment of the present invention.

In the aforesaid tape guide device, the height adjustment screw 118 is constructed as independent assemble parts and the present invention is not limited thereto. Alternatively, the upper flange may have a female screw and the upper flange may have a height adjustment screw function. At this time, the assemble parts can be omitted and the tape guide device can be made small in size.

According to the present invention, as shown in FIGS. 4 to 12, the ultrasonic tape guide device may include the main shaft 101, the upper and lower flanges 109, 108, 114, 115, the height adjustment screw 118, the coil spring 116, the tubular guide member 102, the ultrasonic vibrator 104 having a free end and the other end thereof being fixed to the guide member 102 for applying standing-wave vibrations to the guide member 102 and the support shaft 106 having teeth 106a, 106b.

The teeth 106a, 106b on the support shaft 106 are disposed in an opposing relation to the nodes of vibrations generated on the guide member 102. The adhesive 107 that becomes the resilient member after having been cured is filled into the uniform clearance 110 between the teeth 106a, 106b and the guide member 102. Therefore, the adhesive 107 is filled into the clearance 110 owing to the capillary action. The bonded portion is limited to the portion near the teeth 106a, 106b opposing the nodes, thereby preventing the vibrations from being attenuated when other portions than the nodes are bonded.

Since the support shaft 106 has a length substantially equal to the distance between the nodes of the vibrations, an adhesive instrument such as a fountain pen filler or the like can be located close to the bonding portion. Also, the bonding portion can be seen and therefore the injection work and the confirming work of the adhesive 107 can be easily effected.

There is provided the clearance 110 between the inner diameter of the guide member 102 and the outer diameter of the teeth 106a, 106b. This clearance 110 is filled with the adhesive 107 that becomes the resilient member after having been cured. Hence, the guide member 102 and the teeth 106a, 106b are not required to be machined in inner diameter and in outer diameter with high accuracy and these assemble parts can be made inexpensive to manufacture.

The upper and lower flanges 109, 108 may have the cylindrical portions 109c, 108c. Therefore, even when the end faces of the support shaft 106 are brought in contact with the end faces of the cylindrical portions 109c, 108c, the clearances t and u are produced, respectively, between the end face of the guide member 102 and the upper and lower flange guide surfaces 109a, 108b. Hence, the end face of the guide member 102 can be prevented from being urged against the upper and lower flange guide surfaces 109a, 108b and the vibration of the guide member 102 can be prevented from being attenuated.

When the height adjustment nut 118 is turned, the portion between the upper and lower flanges 109, 108 can be guided by the main shaft 101 in the height direction under or against the bias of the coil spring 116. Hence, the adjustment mechanism for adjusting the position in the height direction can be realized by the simple structure and the tape travel can be guided in an optimum fashion.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape guide device comprising:
   a guide member;
   a support shaft;
   flanges;
   a main shaft;
   a coil spring;
   a height adjustment nut; and
   vibrating means for vibrating said guide member, wherein said support shaft is disposed inside said guide member, said support shaft has teeth facing to a position of a node when said guide member is vibrated by said vibrating means, said teeth and said guide member are fixedly bonded to each other by a resilient adhesive, said main shaft is engaged with said support shaft so as to become freely slidable, said flanges are attached to the support shaft with a longitudinal clearance between said flanges and respective end faces of said guide member, said coil spring exerting a bias force on one of said flanges and said guide member and said flanges being adjustable in height relative to said main shaft by turning said height adjustment nut.

2. The tape guide device according to claim 1, wherein said guide member is cylindrical in shape.

3. The tape guide device according to claim 2, wherein said teeth are formed on said support shaft at its portions near respective end portions thereof.

4. The tape guide device according to claim 3, wherein said vibrating means is an ultrasonic vibrator.

5. The tape guide device according to claim 4, wherein said vibrating means is disposed at the position corresponding to a substantially intermediate position of said teeth respectively formed near respective ends of said support shaft.

6. A tape guide device comprising:
   a guide member;
   a support shaft;
   a flange;
   a main shaft;
   a coil spring; and
   vibrating means for vibrating said guide member, wherein said support shaft is disposed inside said guide member, said support shaft has teeth facing to a position of a node when said guide member is vibrated by said vibrating means, said teeth and said guide member are fixedly bonded to each other by a resilient adhesive, said main shaft is engaged with said support shaft so as to become freely slidable, said flange is attached with a longitudinal clearance between it and an end face of said guide member, said coil spring exerting a bias force on said flange and said guide member and said flange being adjustable in height relative to said main shaft by turning said flange.

* * * * *